(12) United States Patent
Fujimoto et al.

(10) Patent No.: US 11,541,486 B2
(45) Date of Patent: Jan. 3, 2023

(54) CONNECTING METHOD AND CONNECTING APPARATUS

(71) Applicant: OLYMPUS CORPORATION, Hachioji (JP)

(72) Inventors: Takaaki Fujimoto, Hirosaki (JP); Tomokazu Shimizu, Nagano (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/472,830

(22) Filed: Sep. 13, 2021

(65) Prior Publication Data

US 2021/0402528 A1 Dec. 30, 2021

Related U.S. Application Data

(63) Continuation of application No. PCT/JP2020/007519, filed on Feb. 25, 2020.

(30) Foreign Application Priority Data

Mar. 18, 2019 (JP) .............................. JP2019-050309

(51) Int. Cl.
*B23P 11/02* (2006.01)
(52) U.S. Cl.
CPC .................... *B23P 11/025* (2013.01)
(58) Field of Classification Search
CPC ....... B23P 11/025; B23P 11/027; B23P 19/02; B23P 19/10; B23P 19/12
See application file for complete search history.

(56) References Cited

U.S. PATENT DOCUMENTS

| 4,635,336 A * | 1/1987 | Ades ...................... F01D 5/025 |
| | | 29/259 |
| 6,796,050 B2 * | 9/2004 | Haimer ............... B23B 31/1179 |
| | | 33/639 |

(Continued)

FOREIGN PATENT DOCUMENTS

| JP | S59159409 A | 9/1984 |
| JP | 2002046029 A | 2/2002 |

(Continued)

OTHER PUBLICATIONS

Machine Translation of JP 2015-150627 A (Year: 2015).*

(Continued)

*Primary Examiner* — Christopher J Besler
(74) *Attorney, Agent, or Firm* — Holtz, Holtz & Volek PC (57) ABSTRACT

A connecting method includes: measuring at least one of control dimensions that influence a dimension of a member obtained by connection of a first member and a second member to each other, the second member including a connection insertion portion where the first member is inserted; determining, according to the at least one of the control dimensions, a relative position for positioning the first member and the second member by insertion of the first member in the connection insertion portion; heating the second member to a first temperature; inserting the first member in the connection insertion portion to place the first member and the second member in the relative position; and stopping the heating of the second member and maintaining the first member and the second member in the relative position.

3 Claims, 7 Drawing Sheets

(56) References Cited

U.S. PATENT DOCUMENTS

| | | | |
|---|---|---|---|
| 6,857,177 B2 * | 2/2005 | Taylor | B23P 11/027 |
| | | | 29/800 |
| 2001/0042295 A1 | 11/2001 | Voss et al. | |
| 2003/0192161 A1 | 10/2003 | Voss et al. | |
| 2006/0049180 A1 | 3/2006 | Haimer et al. | |
| 2019/0105741 A1 | 4/2019 | Shimizu | |

FOREIGN PATENT DOCUMENTS

| | | |
|---|---|---|
| JP | 2015150627 A | 8/2015 |
| JP | 2017222000 A | 12/2017 |

OTHER PUBLICATIONS

International Search Report (ISR) (and English language translation thereof) dated Jun. 2, 2020 issued in International Application No. PCT/JP2020/007519.

* cited by examiner

CONNECTING METHOD AND CONNECTING APPARATUS

This application is a continuation of PCT international application Ser. No. PCT/JP2020/007519, filed on Feb. 25, 2020 which designates the United States, incorporated herein by reference, and which claims the benefit of priority from Japanese Patent Applications No. 2019-050309, filed on Mar. 18, 2019, incorporated herein by reference.

BACKGROUND

The present disclosure relates to connecting methods and connecting apparatuses.

Shrinkage fitting has been known as a connecting method for connecting two objects to be connected to each other, the two objects being a first member and a second member having a connection insertion portion where the first member is inserted (see, for example, Japanese Patent Application Laid-open No. 2015-150627 and Japanese Patent Application Laid-open No. 2017-222000).

This shrinkage fitting is a technique in which the connection insertion portion is expanded in diameter by thermal expansion of the second member through heating of the second member beforehand, the first member is inserted in the connection insertion portion that has been expanded in diameter, and the first member and the second member are connected to each other by utilization of shrinkage in diameter of the connection insertion portion upon cooling.

Japanese Patent Application Laid-open No. 2015-150627 describes a technique in which the outer diameter of the first member and the inner diameter of the second member are measured and the shrinkage fitting temperature is optimized according to results of this measurement.

Japanese Patent Application Laid-open No. 2017-222000 describes a technique in which the strength of connection between the first member and the second member is increased by causing, in an additional heating process after the first member has been inserted in the connection insertion portion, plastic deformation in the direction in which the inner diameter of the second member is reduced, using a thermal expansion restraining member that restrains outward expansion of the second member in a plane orthogonal to an insertion direction in which the first member is inserted.

SUMMARY

According to one aspect of the present disclosure, there is provided a connecting method including: measuring at least one of control dimensions that influence a dimension of a member obtained by connection of a first member and a second member to each other, the second member including a connection insertion portion where the first member is inserted; determining, according to the at least one of the control dimensions, a relative position for positioning the first member and the second member by insertion of the first member in the connection insertion portion; heating the second member to a first temperature; inserting the first member in the connection insertion portion to place the first member and the second member in the relative position; and stopping the heating of the second member and maintaining the first member and the second member in the relative position.

According to another aspect of the present disclosure, there is provided a connecting method including: measuring at least one of control dimensions that influence a dimension of a member obtained by connection of a first member and a second member to each other, the second member including a connection insertion portion where the first member is inserted; determining, according to the at least one of the control dimensions, a relative position for positioning the first member and the second member by insertion of the first member in the connection insertion portion; placing, outside the second member, a thermal expansion restraining member that restrains outward thermal expansion of the second member in a plane orthogonal to a direction in which the first member is inserted; heating the second member to a first temperature; inserting the first member in the connection insertion portion to place the first member and the second member in the relative position; and heating the second member to a second temperature higher than the first temperature.

According to still another aspect of the present disclosure, there is provided a connecting apparatus including: a first member holder configured to hold a first member; a second member holder configured to hold a second member including a connection insertion portion where the first member is to be inserted; a measuring device configured to measure at least one of control dimensions that influence a dimension of a member obtained by connection of the first member and the second member to each other; a processor configured to determine, according to the at least one of the control dimensions, a relative position for positioning the first member and the second member by insertion of the first member in the connection insertion portion; a heater configured to heat the second member; and a first member inserting unit configured to move in conjunction with the first member holder or the second member holder and insert the first member in the connection insertion portion to place the first member and the second member in the relative position.

According to yet another aspect of the present disclosure, there is provided a connecting apparatus including: a first member holder configured to hold a first member; a second member holder configured to hold a second member including a connection insertion portion where the first member is inserted; a measuring device configured to measure at least one of control dimensions that influence a dimension of a member obtained by connection of the first member and the second member to each other; a processor configured to determine, according to the at least one of the control dimensions, a relative position for positioning the first member and the second member by insertion of the first member in the connection insertion portion; a thermal expansion restraining member configured to restrain outward thermal expansion of the second member in a plane orthogonal to a direction in which the first member is inserted; a heater configured to heat the thermal expansion restraining member and the second member; and a first member inserting unit configured to move in conjunction with the first member holder or the second member holder and insert the first member in the connection insertion portion to place the first member and the second member in the relative position.

The above and other features, advantages and technical and industrial significance of this disclosure will be better understood by reading the following detailed description of presently preferred embodiments of the disclosure, when considered in connection with the accompanying drawings.

DETAILED DESCRIPTION

Embodiments of a connecting method and a connecting apparatus, according to the present disclosure, will be described below by reference to the drawings. The present disclosure is not limited by these embodiments. The embodiments are generally applicable to connecting methods and connecting apparatuses in which a first member that is bar-shaped and a second member that has a connection insertion portion where the first member is inserted are connected to each other.

Any elements that are the same or corresponding to each other are assigned with the same reference sign throughout the drawings, as appropriate. It also needs to be noted that the drawings are schematic, and relations between dimensions of each element therein and proportions between the elements therein may be different from the actual ones. The drawings may also include a portion that differs in its dimensional relations or proportions between the drawings.

First Embodiment

Figure 1:
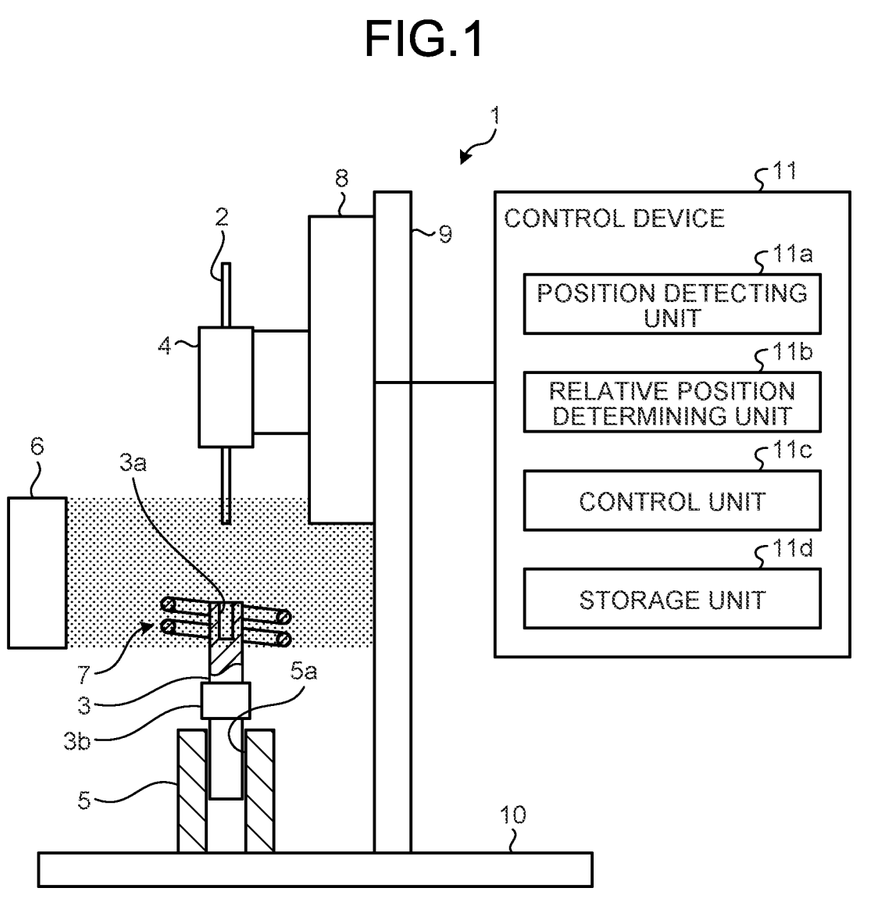
FIG. 1 is a schematic diagram illustrating a configuration of a connecting apparatus according to a first embodiment.

FIG. 1 is a schematic diagram illustrating a configuration of a connecting apparatus according to a first embodiment. As illustrated in FIG. 1, a connecting apparatus 1 according to the first embodiment is a connecting apparatus that connects a first member 2 and a second member 3 to each other. The connecting apparatus 1 includes a first member holding unit 4, a second member holding unit 5, a measuring unit 6, an electromagnetic induction heating coil 7, a first member inserting unit 8, a holding unit 9, a base unit 10, and a control device 11. FIG. 1 illustrates a state before the first member 2 and the second member 3 are connected to each other. FIG. 1 is a side view of the connecting apparatus 1, a part of the connecting apparatus 1 has been cut out therein, and the cut section is illustrated with hatching therein.

The first member 2 is formed of an approximately cylindrical member that is bar-shaped. The first member 2 is formed of, for example, a titanium alloy.

The second member 3 is an approximately cylindrical member having a connection insertion portion 3a formed at one end of the second member 3, the connection insertion portion 3a being a cylindrical recessed portion where the first member 2 is to be inserted. The second member 3 is formed of, for example, an aluminum alloy having a coefficient of linear expansion α of about $25 \times 10^{-6}/°$ C. Furthermore, the second member 3 has a stepped portion 3b in the middle of the length of the second member 3, the length being along the insertion direction. A lower end of the stepped portion 3b comes into contact with an upper end of the second member holding unit 5 to position the second member 3 relatively to the second member holding unit 5.

The first member 2 and the second member 3 are connected to each other in a state where the first member 2 has been inserted in the connection insertion portion 3a. The direction in which the first member 2 is inserted into the connection insertion portion 3a will hereinafter be referred to as an insertion direction A. An outer diameter of a portion of the first member 2 is larger than an inner diameter of the connection insertion portion 3a, the portion being a portion that is inserted in the connection insertion portion 3a. The connection insertion portion 3a is expanded in diameter by thermal expansion of the second member 3 through heating of the second member 3, the first member 2 is inserted in the connection insertion portion 3a when the connection insertion portion 3a has been expanded in diameter, and the first member 2 and the second member 3 are connected to each other by utilization of shrinkage in diameter of the connection insertion portion 3a upon cooling.

The first member 2 and the second member 3 that have been connected to each other (hereinafter, referred to as the "connected member") are used, for example, in an ultrasound treatment tool for treating living tissue by application of ultrasound energy to the living tissue. Specifically, the connected member is used as a probe that transmits ultrasound vibration generated by an ultrasound transducer from one end (a lower end portion in FIG. 1) of the probe to the other end (an upper end portion in FIG. 1) of the probe, the other end being an end that comes into contact with the living tissue.

Configuration of Connecting Apparatus

A configuration of the connecting apparatus 1 that connects the first member 2 and the second member 3 to each other will be described next.

The first member holding unit 4 holds the first member 2. Specifically, the first member holding unit 4 is a cylindrical member having an inner diameter that is approximately the same as an outer diameter of the first member 2, and the first member holding unit 4 holds the first member 2 that has been inserted through the first member holding unit 4.

The second member holding unit 5 holds the second member 3. Specifically, the second member holding unit 5 is an approximately cylindrical member having a second member insertion hole 5a formed at one end of the second member holding unit 5, the second member insertion hole 5a being a cylindrical recessed portion. The second member holding unit 5 holds the second member 3 that has been inserted in the second member insertion hole 5a.

The measuring unit 6 measures at least one of control dimensions, the control dimensions influencing a dimension of the member obtained by connection of the first member 2 and the second member 3 to each other. The control dimensions include the outer diameter of the portion of the first member 2, the portion being the portion to be inserted in the connection insertion portion 3a, and/or the inner diameter of the connection insertion portion 3a. The control dimensions may include a length of the first member 2 and/or a height of the second member 3. In other words, the measuring unit 6 measures at least one of: the outer diameter of the portion of the first member 2, the portion being the portion to be inserted in the connection insertion portion 3a; the inner diameter of the connection insertion portion 3a; the length of the first member 2; or the height of the second member 3. By measuring, using the measuring unit 6, the control dimensions, an accurate longitudinal dimension of the connected member is able to be achieved, and any of the control dimensions may be a median value of the dimensional tolerance or a median value of the variation. The measuring unit 6 is a laser measuring machine that irradiates a target to be measured with laser light to measure a dimension of the target.

The electromagnetic induction heating coil 7 is wound around an outer peripheral surface of the second member 3, with a predetermined clearance between the electromagnetic induction heating coil 7 and the outer peripheral surface. By supply of high-frequency electric current from a high-frequency power source (not illustrated in the drawings) to the electromagnetic induction heating coil 7, the second member 3 is induction-heated indirectly. However, a mechanism to directly heat the second member 3 using hot air, for example, may be provided as a heating unit.

The first member inserting unit 8 moves in conjunction with the first member holding unit 4, and causes the first member holding unit 4 holding the first member 2 to move along the insertion direction A to insert the first member 2 in the connection insertion portion 3a of the second member 3 and place the first member 2 and the second member 3 in their relative position determined by a relative position determining unit 11b described later. Furthermore, the first member inserting unit 8 causes the first member holding unit 4 holding the first member 2 to move in a direction orthogonal to the insertion direction A to perform positioning between the first member 2 and the connection insertion portion 3a of the second member 3. However, the first member inserting unit 8 may be configured to insert the first member 2 in the connection insertion portion 3a of the second member 3 by moving in conjunction with the second member holding unit 5.

The holding unit 9 holds the first member inserting unit 8, and the first member holding unit 4 holding the first member 2.

The base unit 10 functions as a base for fixing the holding unit 9 and the second member holding unit 5.

The control device 11 has: a position detecting unit 11a that detects a position of the first member 2 or second member 3; the relative position determining unit 11b that determines a relative position between the first member 2 and the second member 3; a control unit 11c that integrally controls the overall connecting apparatus 1; and a storage unit 11d where, for example, various programs for controlling the connecting apparatus 1 are recorded.

The relative position determining unit 11b determines, according to a control dimension that has been measured by the measuring unit 6, a relative position for positioning the first member 2 and the second member 3 by insertion of the first member 2 in the connection insertion portion 3a. Specifically, the relative position determining unit 11b determines the relative position by referring to a database stored in the storage unit 11d beforehand.

The control unit 11c controls driving of the first member inserting unit 8 and integrally controls the first member holding unit 4, the second member holding unit 5, and the electromagnetic induction heating coil 7, for example. The control unit 11c is implemented using, for example, a central processing unit (CPU) and/or various arithmetic circuits having arithmetic and control functions.

The storage unit 11d stores various programs for executing operation of the connecting apparatus 1. The storage unit 11d is implemented using a read only memory (ROM) and a random access memory (RAM) that stores arithmetic parameters and data for processing, for example.

Connecting Method

Figure 2:
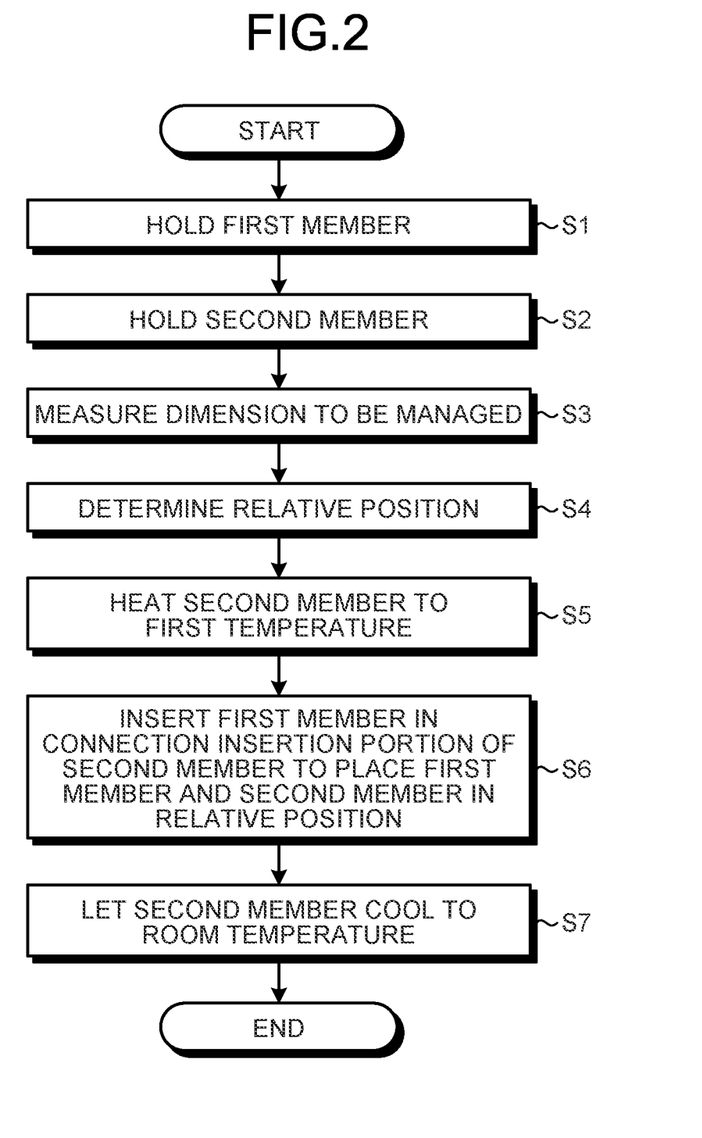
FIG. 2 is a flowchart illustrating a method of connecting a first member and a second member to each other using the connecting apparatus illustrated in FIG. 1.

A method of connecting the first member 2 and the second member 3 to each other using the connecting apparatus 1 will be described next. FIG. 2 is a flowchart illustrating a method of connecting a first member and a second member to each other using the connecting apparatus illustrated in FIG. 1.

Firstly, an operator causes the first member holding unit 4 to hold the first member 2 (Step S1). The operator also causes the second member holding unit 5 to hold the second member 3 (Step S2).

Subsequently, by using the measuring unit 6, the operator measures a control dimension that is, for example, an outer diameter of the first member 2 (Step S3).

When the operator inputs the outer diameter of the first member 2 measured by the operator, to the control device 11, the relative position determining unit 11b determines, according to the outer diameter of the first member 2, a relative position for positioning the first member 2 and the second member 3 by insertion of the first member 2 in the connection insertion portion 3a (Step S4).

The relative position determining unit 11b firstly calculates a clearance that is a difference between the input outer diameter of the first member 2 and the inner diameter of the connection insertion portion 3a of the second member 3. A value measured by the measuring unit 6 may be used as the inner diameter of the connection insertion portion 3a of the second member 3, but a median value of the dimensional tolerance or a median value of the variation may be used instead.

Figure 3:
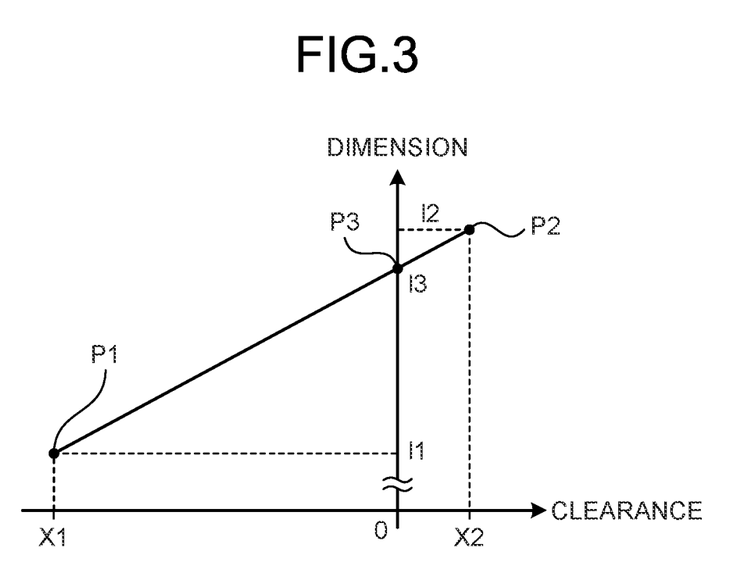
FIG. 3 is a diagram illustrating a relation between clearance between the first member and the second member and length of the second member, upon heating.

FIG. 3 is a diagram illustrating a relation between: clearance between the first member and the second member; and length of the second member, upon heating. In FIG. 3, the horizontal axis represents the clearance between the first member 2 and the second member 3, and the vertical axis represents longitudinal dimension of the second member 3. When the clearance is negative, it means that the outer diameter of the first member 2 is larger than the inner diameter of the connection insertion portion 3a of the second member 3.

As illustrated in FIG. 3, at a point P indicating a state at room temperature before heating, the outer diameter of the first member 2 is larger than the inner diameter of the connection insertion portion 3a of the second member 3, and the clearance is thus at a negative value X1. The longitudinal dimension of the second member 3 at this point is a length 11.

Subsequently, at a point P2 indicating a state where the second member 3 has been heated to a first temperature, the inner diameter of the connection insertion portion 3a of the second member 3 is larger than the outer diameter of the first member 2, and the clearance is thus at a positive value X2. The longitudinal dimension of the second member 3 at this point has become larger due to thermal expansion and is a length 12. The first member 2 is inserted in the connection insertion portion 3a of the second member 3 in this state.

Thereafter, as the second member 3 is cooled, a state indicated by a point P3 is reached at a contact temperature Tx1 (a temperature lower than the first temperature), the state being where the outer diameter of the first member 2 and the inner diameter of the connection insertion portion 3a of the second member 3 match each other (the outer peripheral surface of the first member 2 contacts the inner peripheral surface of the connection insertion portion 3a), and the first member 2 and the second member 3 are thus connected to each other. The longitudinal dimension of the second member 3 at this point is a length 13. When the second member 3 returns to room temperature, the longitudinal dimension of the second member 3 returns approximately to the length 11.

The connected member resulting from the connection of the first member 2 and the second member 3 to each other also decreases in length according to the amount of change in length, 13-11, in the change from the state at the point P3 to the state at the point P1. That is, the length of the connected member is decreased correspondingly to the clearance between the first member 2 and the second member 3. This relation between the length of the connected member and the clearance is found beforehand by measurement of plural connected members manufactured in advance, and is stored as a database in the storage unit 11d.

In the connecting apparatus 1, the relative position determining unit 11b thus refers to the database stored in the storage unit 11d, and determines, based on a clearance obtained through measurement by the measuring unit 6, a relative position for positioning the first member 2 and the second member 3 by insertion of the first member 2 in the connection insertion portion 3a. Specifically, to correct the decrease in length of the connected member according to the clearance, the relative position determining unit 11b determines the relative position such that a distal end of the first member 2 is separated from a bottom portion of the connection insertion portion 3a by a length corresponding to the clearance when the first member 2 is inserted in the connection insertion portion 3a.

Thereafter, the operator supplies high frequency electric current from the high-frequency power source (not illustrated in the drawings) to the electromagnetic induction heating coil 7 to inductively heat the second member 3. The second member 3 is then heated to the first temperature (Step S5).

The second member 3 is thermally expanded by execution of this Step S5. The inner diameter of the connection insertion portion 3a then gradually increases. The first temperature is a temperature at which the inner diameter of the connection insertion portion 3a becomes larger than the outer diameter of the first member 2.

Subsequently, the operator stops the supply of high-frequency electric current from the high-frequency power source (not illustrated in the drawings) to the electromagnetic induction heating coil 7 (stops induction heating of the second member 3), and causes the first member inserting unit 8 to operate to insert the first member 2 in the connection insertion portion 3a of the second member 3 and place the first member 2 and the second member 3 in their relative position, such that the central axis of the second member 3 is aligned with the central axis of the first member 2 (Step S6). As described above, when this is done, the distal end of the first member 2 is separated from the bottom portion of the connection insertion portion 3a by the length corresponding to the clearance. This inserting process may be performed in a state where the second member 3 has been inductively heated and maintained at the first temperature.

Subsequently, the operator maintains the state where the supply of high-frequency electric current to the electromagnetic induction heating coil 7 from the high-frequency power source (not illustrated in the drawings) has been stopped (maintains the state where the heating of the second member 3 has been stopped), and lets the second member 3 to cool to room temperature with the first member 2 and second member 3 maintained in the relative position (Step S7).

In the above described connecting method, by placing the first member 2 and the second member 3 in their relative position by insertion of the first member 2 in the connection insertion portion 3a, variation in the length of the connected member caused according to variation in the clearance between the first member 2 and second member 3 is reduced. As a result, according to the first embodiment, the longitudinal dimension of the connected member is accurate.

Conventionally, when a variation is generated in the longitudinal dimensions of connected members, a process for adjusting the longitudinal dimensions of the connected members is needed and thus additional work is needed. However, according to the first embodiment, because longitudinal dimensions of connected members are accurate, a process of adjusting the longitudinal dimensions of the connected members is not needed.

Second Embodiment

Figure 4:
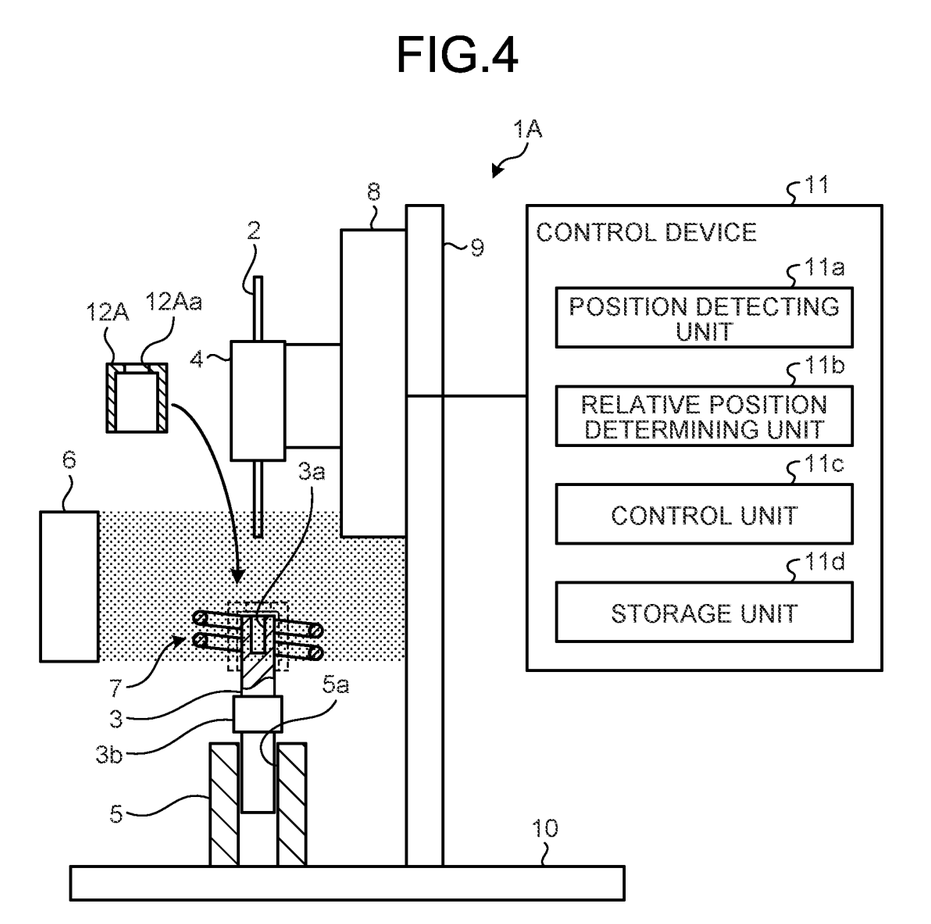
FIG. 4 is a schematic diagram illustrating a configuration of a connecting apparatus according to a second embodiment.

FIG. 4 is a schematic diagram illustrating a configuration of a connecting apparatus according to a second embodiment. As illustrated in FIG. 4, a connecting apparatus 1A according to the second embodiment includes a thermal expansion restraining member 12A. Because the rest of the configuration is the same as that of the first embodiment, description thereof will be omitted.

The thermal expansion restraining member 12A restrains outward thermal expansion of the second member 3 in a plane orthogonal to the insertion direction A. The thermal expansion restraining member 12A is formed of a cylindrical member extending along the insertion direction A. The thermal expansion restraining member 12A is formed of, for example, Kovar having a coefficient of linear expansion s of about $5 \times 10^{-6}/°$ C. That is, the thermal expansion restraining member 12A is formed of a material having the coefficient of linear expansion $\beta$ lower than the coefficient of linear expansion $\alpha$ of the second member 3.

An inner diameter of this thermal expansion restraining member 12A is set to be larger than the outer diameter of the second member 3 at room temperature. Furthermore, a dimension of the thermal expansion restraining member 12A, the dimension being along a height direction of the thermal expansion restraining member 12A (along the insertion direction A) is not particularly limited as long the dimension enables the thermal expansion restraining member 12A to cover at least a part of a portion of the second member 3, the portion being where the connection insertion portion 3a is formed. Furthermore, a through hole 12Aa where the first member 2 is to be inserted is formed in an upper end portion of the thermal expansion restraining member 12A. An inner diameter of the through hole 12Aa is sufficiently larger than the outer diameter of the first member 2.

Furthermore, a control dimension in this second embodiment is: the outer diameter of the portion of the first member 2, the portion being the portion that is inserted in the connection insertion portion 3a; the inner diameter of the connection insertion portion 3a; an outer diameter of a portion of the second member 3, the outer diameter being an outer diameter that is restrained by the thermal expansion restraining member; or the inner diameter of the thermal expansion restraining member 12A. In other words, the measuring unit 6 measures any one or more of: the outer diameter of the portion of the first member 2, the portion being the portion that is inserted in the connection insertion portion 3a; the inner diameter of the connection insertion portion 3a; the outer diameter of the portion of the second member 3, the outer diameter being an outer diameter that is restrained by the thermal expansion restraining member 12A; or the inner diameter of the thermal expansion restraining member 12A. By measuring, using the measuring unit 6, the dimension/control dimensions more than once, an accurate longitudinal dimension of the connected member is able to be achieved, but any of the control dimensions may be a median value of the dimensional tolerance or a median value of the variation.

Connecting Method

Figure 5:
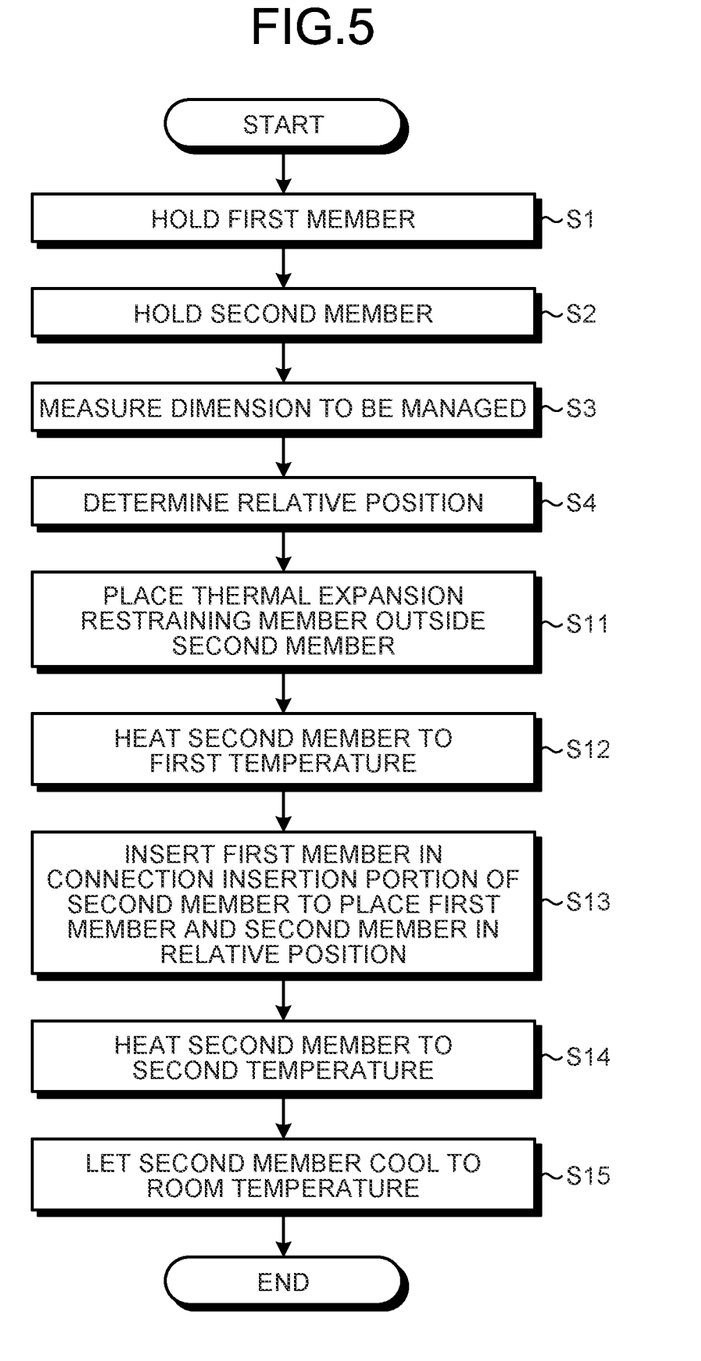
FIG. 5 is a flowchart illustrating a method of connecting a first member and a second member to each other using the connecting apparatus illustrated in FIG. 4.

A method of connecting the first member 2 and the second member 3 to each other using the connecting apparatus 1A will be described next. FIG. 5 is a flowchart illustrating a method of connecting a first member and a second member to each other using the connecting apparatus illustrated in FIG. 4. As illustrated in FIG. 5, processes at Step S1 to Step S4 are executed similarly to the first embodiment.

Subsequently, the operator places the thermal expansion restraining member 12A outside the second member 3 (Step S11). Specifically, the operator places, outside the second member 3, the thermal expansion restraining member 12A that restrains outward thermal expansion of the second member 3 in the plane orthogonal to the insertion direction A, such that the center of the thermal expansion restraining member 12A is aligned approximately with the center of the second member 3.

Thereafter, the operator supplies high frequency electric current to the electromagnetic induction heating coil 7 from the high-frequency power source (not illustrated in the drawings) to inductively heat the thermal expansion restraining member 12A. The second member 3 that has been placed inside the thermal expansion restraining member 12A is then heated to a first temperature by heat transfer from the thermal expansion restraining member 12A (Step S12).

The thermal expansion restraining member 12A and second member 3 undergo thermal expansion by execution of this Step S12. The inner diameter of the thermal expansion restraining member 12A, the outer diameter of the second member 3, and the inner diameter of the connection insertion portion 3a then gradually increase.

As described above, the coefficient of linear expansion $\beta$ of the thermal expansion restraining member 12A is smaller than the coefficient of linear expansion $\alpha$ of the second member 3. Therefore, the outer diameter of the second member 3 changes more largely than the inner diameter of the thermal expansion restraining member 12A. However, because the inner diameter of the connection insertion portion 3a is smaller than the outer diameter of the second member 3, the inner diameter of the connection insertion portion 3a changes more gradually than the outer diameter of the second member 3.

At Step S12, the operator causes the thermal expansion restraining member 12A to be inductively heated until the first member 2 reaches the first temperature. The first temperature is a temperature at which the inner diameter of the connection insertion portion 3a becomes larger than the outer diameter of the first member 2.

Subsequently, the operator stops the supply of high-frequency electric current from the high-frequency power source (not illustrated in the drawings) to the electromagnetic induction heating coil 7 (stops the inductive heating of the thermal expansion restraining member 12A (the heating of the second member 3)), and causes the first member inserting unit 8 to operate to place the first member 2 and the second member 3 in their relative position by insertion of the first member 2 in the connection insertion portion 3a of the second member 3, such that the central axis of the second member 3 is aligned with the central axis of the first member 2 (Step S13). This inserting process may be performed in a state where the second member 3 has been inductively heated and maintained at the first temperature.

Subsequently, the operator supplies high-frequency electric current to the electromagnetic induction heating coil 7 from the high-frequency power source (not illustrated in the drawings) to inductively heat the thermal expansion restraining member 12A again until the second member 3 reaches a second temperature (Step S14). This second temperatures is a temperature higher than the first temperature.

When the second member 3 is heated to the second temperature at Step S14, the second member 3 and the thermal expansion restraining member 12A are thermally expanded. Due to the difference between the coefficients of linear expansion $\alpha$ and $\beta$ of the second member 3 and thermal expansion restraining member 12A, the inner diameter of the thermal expansion restraining member 12A and the outer diameter of the second member 3 match each other (the outer peripheral surface of the second member 3 contacts the inner peripheral surface of the thermal expansion restraining member 12A) when an expansion restraint temperature Tx11 (a temperature lower than the second temperature) is reached.

Thereafter, as the second member 3 increases in temperature from the expansion restraint temperature Tx11, the second member 3 tries to expand thermally but is mechanically restrained by the inner peripheral surface of the thermal expansion restraining member 12A. Therefore, the second member 3 undergoes plastic deformation in a direction not mechanically restrained by the thermal expansion restraining member 12A, that is, a direction in which the inner diameter of the connection insertion portion 3a decreases, and in the height direction (the insertion direction A).

The inner diameter of the connection insertion portion 3a gradually decreases as the expansion restraint temperature Tx11 is exceeded. When a contact temperature Tx12 (a temperature higher than the expansion restraint temperature Tx11) is reached, the inner diameter of the connection insertion portion 3a and the outer diameter of the first member 2 match each other (the outer peripheral surface of the first member 2 contacts the inner peripheral surface of the connection insertion portion 3a).

Subsequently, the operator stops the supply of high-frequency electric current from the high-frequency power source (not illustrated in the drawings) to the electromagnetic induction heating coil 7 (stops the induction heating of the thermal expansion restraining member 12A (the heating of the second member 3)) to let the thermal expansion restraining member 12A and the second member 3 cool to room temperature (Step S15).

Through this cooling at Step S15, the second member 3 and the thermal expansion restraining member 12A contract. Specifically, the inner diameter of the thermal expansion restraining member 12A gradually decreases correspondingly to the contraction of the thermal expansion restraining member 12A, and ultimately becomes the same as the inner diameter of the thermal expansion restraining member 12A before the execution of this connecting method. Furthermore, the outer diameter of the second member 3 gradually decreases correspondingly to the contraction of the second member 3, and ultimately becomes smaller than the outer diameter of the second member 3 before the execution of this connecting method. In addition, the inner diameter of the connection insertion portion 3a tries to gradually decrease correspondingly to the contraction of the second member 3, but because the contraction of the second member 3 is mechanically restrained by the outer peripheral surface of the first member 2, the inner diameter of the connection insertion portion 3a is ultimately maintained at an inner diameter matching the outer diameter of the first member 2. By the above described processes, the first member 2 and the second member 3 are connected to each other.

In the above described connecting method, when a variation is generated in the clearance between the first member 2 and the second member 3 or the clearance between the second member 3 and the thermal expansion restraining member 12A, a variation is generated in the longitudinal dimension of the connected member by a variation in the expansion restraint temperature Tx11 or contact temperature Tx12. However, according to the second embodiment, the relative position determining unit 11b determines the relative position based on a control dimension that is: the outer diameter of the portion of the first member 2, the portion being the portion that is inserted in the connection insertion portion 3a; the inner diameter of the connection insertion portion 3a; the outer diameter of the portion of the second member 3, the outer diameter being an outer diameter that is restrained by the thermal expansion restraining member 12A; or the inner diameter of the thermal expansion restraining member 12A. As a result, the second embodiment enables reduction of the variation in length of the connected member caused according to the variation in the clearance between the first member and second member 3 or the clearance between the second member 3 and thermal expansion restraining member 12A, by placing the first member 2 and second member 3 in their relative position through insertion of the first member 2 in the connection insertion portion 3a. As a result, according to the second embodiment, the longitudinal dimension of the connected member is accurate.

Third Embodiment

Figure 6:
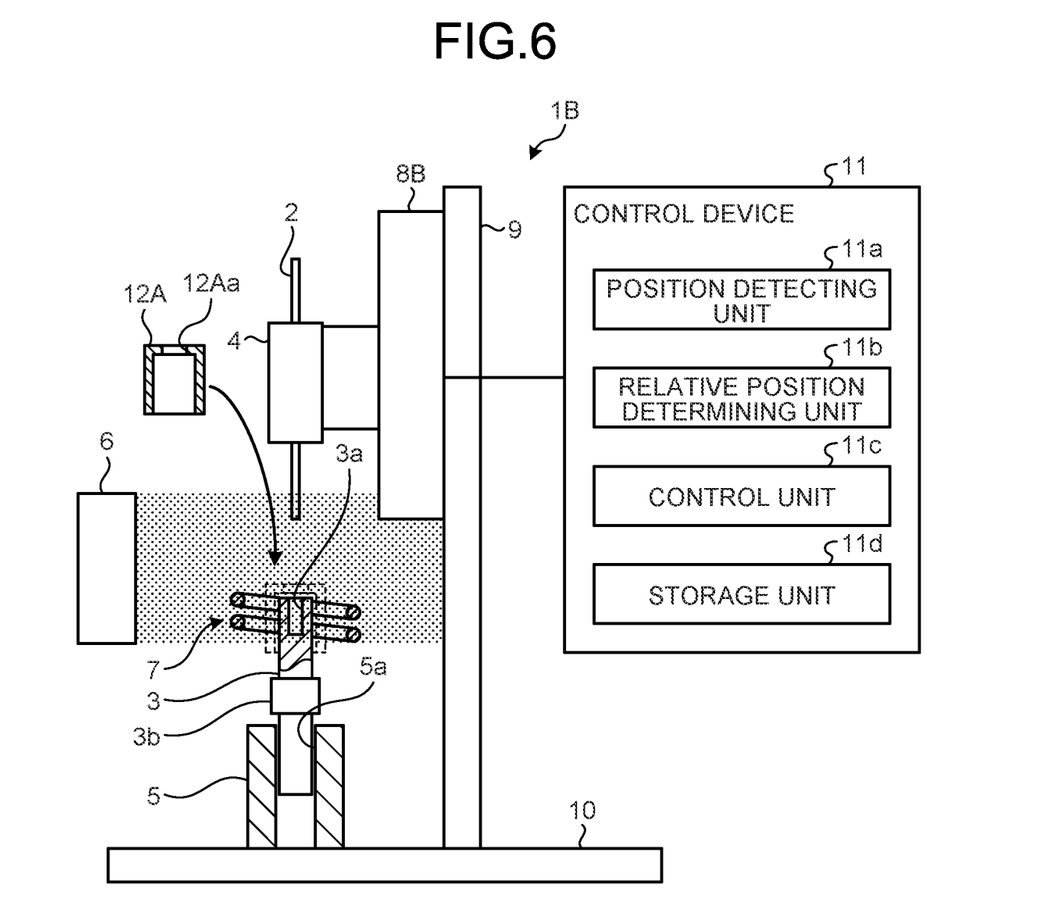
FIG. 6 is a schematic diagram illustrating a configuration of a connecting apparatus according to a third embodiment.

FIG. 6 is a schematic diagram illustrating a configuration of a connecting apparatus according to a third embodiment. As illustrated in FIG. 6, in a connecting apparatus 1B according to the third embodiment, a first member inserting unit 8B controls, under control of the control unit 11c, the position of the first member 2. In other words, the control unit 11c and the first member inserting unit 8B form a programmable logic controller (PLC) and automatically control the position of the first member 2. The rest of the configuration is the same as that of the first or second embodiment and description thereof will thus be omitted.

This PLC automatically moves the position of the first member 2 to a relative position determined according to a result of measurement by the measuring unit 6.

Fourth Embodiment

Figure 7:
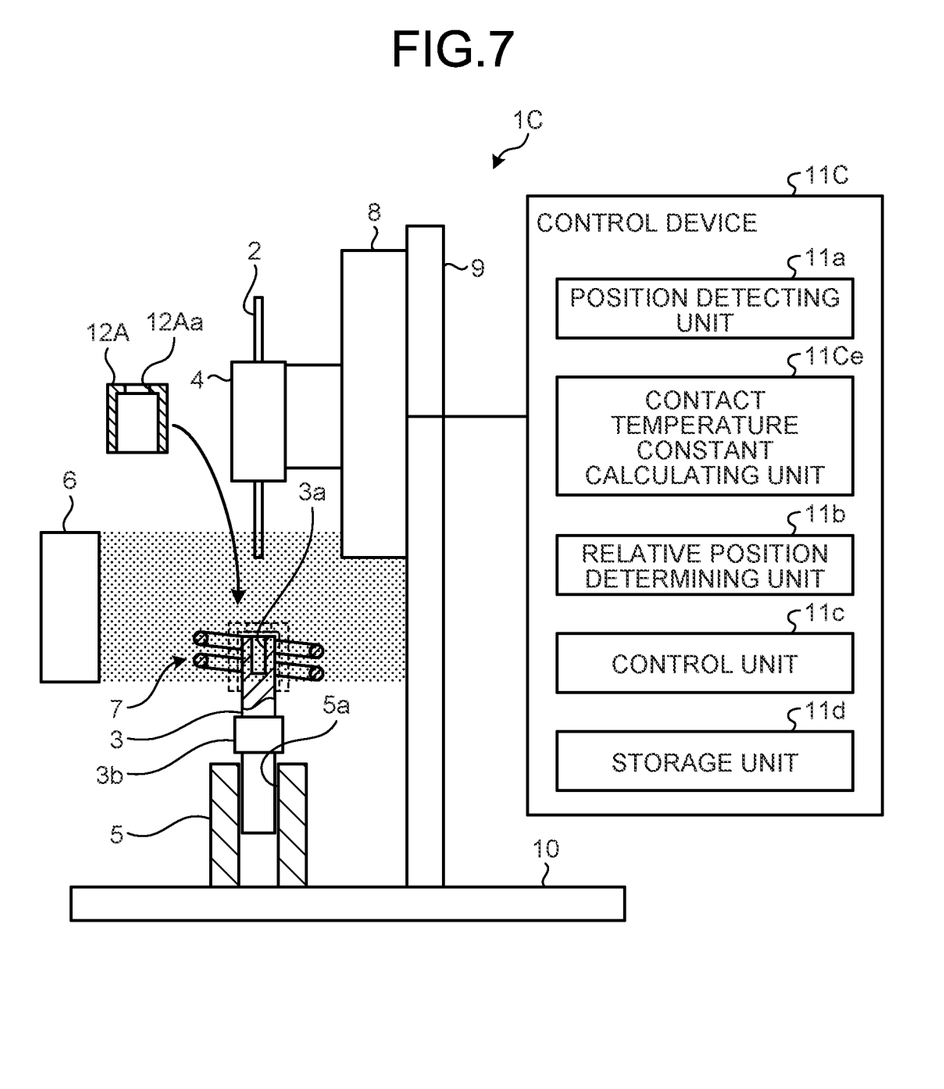
FIG. 7 is a schematic diagram illustrating a configuration of a connecting apparatus according to a fourth embodiment.

FIG. 7 is a schematic diagram illustrating a configuration of a connecting apparatus according to a fourth embodiment. As illustrated in FIG. 7, a control device 11C of a connecting apparatus 1C according to the fourth embodiment has a contact temperature constant calculating unit 11Ce. The rest of the configuration is the same as that of the first, second, or third embodiment and description thereof will thus be omitted.

The contact temperature constant calculating unit 11Ce calculates a contact temperature constant $\alpha \cdot T\Delta$ calculated by Equation (1) below.

$$\alpha \cdot T\Delta = \log \sqrt{\frac{x_0^2 - q_0^2}{R_0^2 - r_0^2}} \tag{1}$$

In Equation (1), $x_o$ is the inner diameter of the thermal expansion restraining member 12A at room temperature, $q_o$ is the outer diameter of the first member 2 at room temperature, $R_o$ is the outer diameter of the second member 3 at room temperature, and $r_o$ is the inner diameter of the connection insertion portion 3a of the second member 3 at room temperature. Furthermore, $\alpha$ is the coefficient of linear expansion of the second member 3. In addition, $T\Delta$ is a difference between room temperature and the contact temperature Tx12 at which the inner diameter of the connection insertion portion 3a of the second member 3 matches the outer diameter of the first member 2 and the outer peripheral surface of the first member 2 contacts the inner peripheral surface of the connection insertion portion 3a. The contact temperature constant calculating unit 11Ce calculates the contact temperature constant $\alpha \cdot T\Delta$ by substituting the control dimensions measured by the measuring unit 6, into Equation (1).

The relative position determining unit 11b determines a relative position by using the contact temperature constant $\alpha \cdot T\Delta$ calculated by the contact temperature constant calculating unit 11Ce. Specifically, the relative position determining unit 11b calculates $T\Delta$ by substituting the coefficient of linear expansion $\alpha$ into Equation (1). The relative position determining unit 11b then estimates how much the first member 2 and the second member 3 contract during $T\Delta$ and determines the relative position to correct this contraction. The relative position determining unit 11b may determine the relative position by arithmetic operations as described above.

The present disclosure enables a connecting method and a connecting apparatus to be provided, the connecting method and the connecting apparatus achieving an accurate longitudinal dimension of a connected member obtained by connection of a first member and a second member to each other.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general concept as defined by the appended claims and their equivalents.

What is claimed is:

1. A connecting method for connecting a first member to a second member by inserting the first member into a connecting insertion portion of the second member, the method comprising:
    measuring at least one of (i) an outer diameter of a portion of the first member that is to be inserted in the connection insertion portion and (ii) an inner diameter of the connection insertion portion, and calculating a clearance that is a difference between the outer diameter of the portion of the first member and the inner diameter of the connection insertion portion;
    determining, based on the clearance, a relative position at which the first member and the second member are to be positioned with respect to each other along an insertion direction of the first member in the connection insertion portion;
    heating the second member to a first temperature;

inserting the first member in the connection insertion portion while the second member is heated to the first temperature to place the first member and the second member at the relative position; and stopping the heating of the second member and maintaining the first member and the second member in the relative position.

2. The connecting method according to claim 1, wherein said determining the relative position is comprises determining the relative position based on the clearance and based further on information in a database that has been stored in a memory.

3. The connecting method according to claim 1, wherein a controller controls a position of at least one of the first member and the second member to position the first member and the second member at the relative position.

* * * * *